(12) United States Patent
Ko

(10) Patent No.: US 6,986,533 B2
(45) Date of Patent: Jan. 17, 2006

(54) PIPE COUPLING

(75) Inventor: Eounjin Ko, Incheon (KR)

(73) Assignee: Join Top Co., Ltd., Incheon (KR)

( * ) Notice: Subject to any disclaimer, the term of this patent is extended or adjusted under 35 U.S.C. 154(b) by 232 days.

(21) Appl. No.: 10/472,104

(22) PCT Filed: Nov. 20, 2001

(86) PCT No.: PCT/KR01/01980

§ 371 (c)(1),
(2), (4) Date: Sep. 15, 2003

(87) PCT Pub. No.: WO03/012330

PCT Pub. Date: Feb. 13, 2003

(65) Prior Publication Data

US 2004/0094950 A1    May 20, 2004

(30) Foreign Application Priority Data

Aug. 2, 2001   (KR) ............................ 2001-23515 U

(51) Int. Cl.
*F16L 37/00* (2006.01)
(52) U.S. Cl. ....................... 285/313; 285/317; 285/323
(58) Field of Classification Search ................ 285/307, 285/313, 316, 317, 322, 323
See application file for complete search history.

(56) References Cited

U.S. PATENT DOCUMENTS 2,138,913 A * 12/1938 Fotsch ........................ 285/322
2,702,202 A * 2/1955 Kaiser ........................ 285/317

FOREIGN PATENT DOCUMENTS

EP         0427306 A2 *   5/1991   ................. 285/322

OTHER PUBLICATIONS

Patent Abstracts of Japan Publication No. 06-249381, entitled Pipe Coupling and Locking Device Therefor, By Hitoshi et al., published Sep. 6, 1994.

* cited by examiner

*Primary Examiner*—David Bochna
(74) *Attorney, Agent, or Firm*—Bachman & LaPointe, P.C.

(57) ABSTRACT

A pipe coupling, which enables pipes to be assembled with the pipe coupling by an one-touch operation while maintaining the liquid-tightness at jointing portions. In the pipe coupling, a connection tube has holding shoulders formed at opposite predetermined inner portions of the connection tube and maximum diameter portions formed at both side portions of the connection tube outside of the holding shoulders. The connection tube has an inner diameter decreasing in a direction toward both mouths of the connection tube from the maximum diameter portions. Snap rings are inserted inside of the mouths of the connection tube in a compressed state. Packing members are tightly disposed in each of the maximum diameter portions. Jaw couplings are inserted in the mouths of the connection tube and each of the jaw couplings are assembled with a plurality of fixing jaws and having engaging protuberances. The fixing jaws are arranged in a circumferential direction of each of the jaw couplings. Each of the engaging protuberances has a width smaller than an interval of a spaced portion of each of the snap rings. The engaging protuberances are engaged with inner ends of the snap ring. Elastic members are inserted between the jaw couplings and the packing members.

4 Claims, 5 Drawing Sheets

PIPE COUPLING

TECHNICAL FIELD

The present invention relates to a pipe coupling, which enables pipes to be connected with and separated from each other by a one-touch operation.

BACKGROUND ART

In general, the liquid-tightness and the degree of coupling have been recognized as the most important factors in connecting hydraulic pipes with each other. Therefore, most of the couplings for connecting pipes, which have various shapes such as those of a linear tube, a bent tube, and a T-shaped tube, are screw-coupled with the hydraulic pipes and include packing members such as O-rings inserted in jointing portions, in common.

However, the usual coupling is assembled with the hydraulic pipes by means of a screw joint, in which case a strong jointing force is required and separate tightening tools are necessary in assembling the pipes with each other. Moreover, when the joint is not firmly maintained, the liquid-tightness can be deteriorated, so that liquid can leak through joint portions, and thereby the reliability on the connection between the pipes are deteriorated.

DISCLOSURE OF INVENTION

Accordingly, the present invention has been made to solve the above-mentioned problems occurring in the prior art, and an object of the present invention is to provide a pipe coupling having an improved construction, which enables pipes to be assembled with the pipe coupling by a one-touch operation while maintaining the liquid-tightness at jointing portions.

It is another object of the present invention to provide a pipe coupling, in which accessories of the coupling can be separated and easily replaced.

It is another object of the present invention to provide a pipe coupling, by which even large pipes can be easily and exactly connected with each other.

In order to accomplish these objects, there is provided a pipe coupling for connecting pipes with each other, the pipe coupling comprising: a connection tube having changing inner and outer diameters, the connection tube including holding shoulders formed at opposite predetermined inner portions of the connection tube and maximum diameter portions formed at both side portions of the connection tube outside of the holding shoulders, each of the holding shoulders limiting a depth by which each of the pipes can be inserted, the maximum diameter portions respectively having an inner diameter much larger than an outer diameter of the pipes, the connection tube having an inner diameter which decreases in a direction toward both mouths of the connection tube from the maximum diameter portions; snap rings inserted inside of the mouths of the connection tube in a compressed state; packing members, each of which is tightly disposed in each of the maximum diameter portions; jaw couplings inserted in the mouths of the connection tube, each of the jaw couplings being assembled with a plurality of fixing jaws and having engaging protuberances, the fixing jaws respectively having serrations formed at a surface to be in contact with each of the pipes, the fixing jaws being arranged in a circumferential direction of each of the jaw couplings, each of the engaging protuberances having a width smaller than an interval of a spaced portion of each of the snap rings, the engaging protuberances being engaged with inner ends of the snap ring; and elastic members inserted between the jaw couplings and the packing members.

In accordance with another embodiment of the present invention, there is provided a pipe coupling for connecting pipes with each other, the pipe coupling comprising: a central connection tube having a through hole axially formed in the central connection tube and holding shoulders formed at both ends of the through hole so as to limit a depth by which each of the pipes can be inserted; side connection tubes assembled at both sides of the central connection tube in such a manner as to respectively communicate with the central connection tube, each of the side connection tube having an inner space, through which each of the pipes is inserted, and whose construction and shape have dimensions gradually decreasing from the central connection tube toward mouths of the side connection tubes; packing members respectively interposed between the central connection tube and each of the side connection tubes; snap rings respectively inserted inside of the mouths of the side connection tubes in a compressed state; jaw couplings respectively inserted in each of the mouths of the side connection tube, each of the jaw couplings being assembled with a plurality of fixing jaws and having engaging protuberances, the fixing jaws respectively having serrations formed at a surface to be in contact with each of the pipes, the fixing jaws being arranged in a circumferential direction of each of the jaw couplings, each of the engaging protuberances having a width smaller than an interval of a spaced portion of each of the snap rings, the engaging protuberances being engaged with inner ends of the snap ring; and elastic members respectively inserted between the jaw coupling and a vertical inner wall of each side connection tube, the vertical inner wall being disposed at a side of the central connection tube.

BRIEF DESCRIPTION OF DRAWINGS

The above and other objects, features and advantages of the present invention will be more apparent from the following detailed description taken in conjunction with the accompanying drawings, in which.

BEST MODE FOR CARRYING OUT THE INVENTION

Hereinafter, several preferred embodiments of the present invention will be described with reference to the accompanying drawings.

Figure 1:
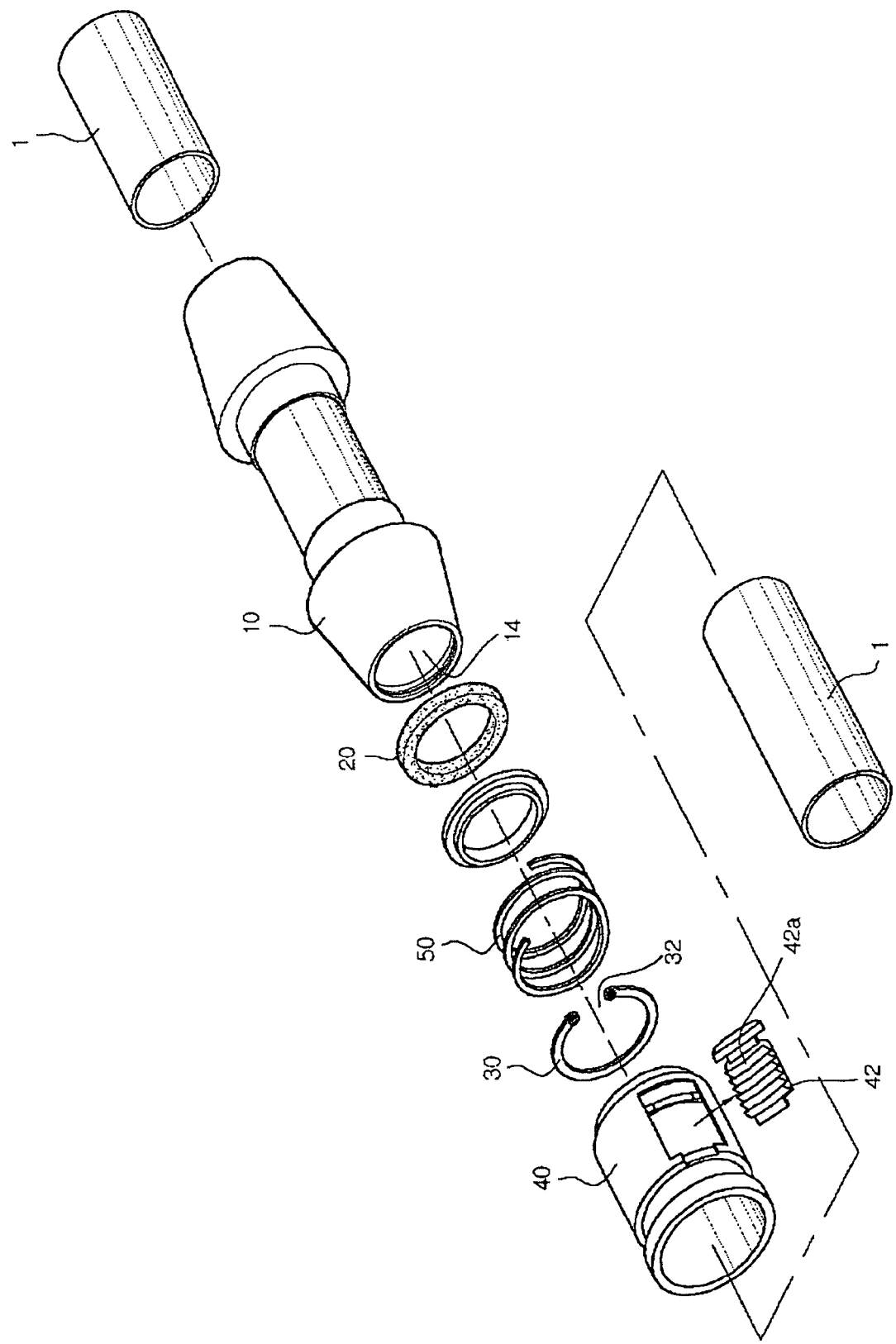
FIG. 1 is an exploded perspective view of a pipe coupling according to the first embodiment of the present invention.
Figure 2:
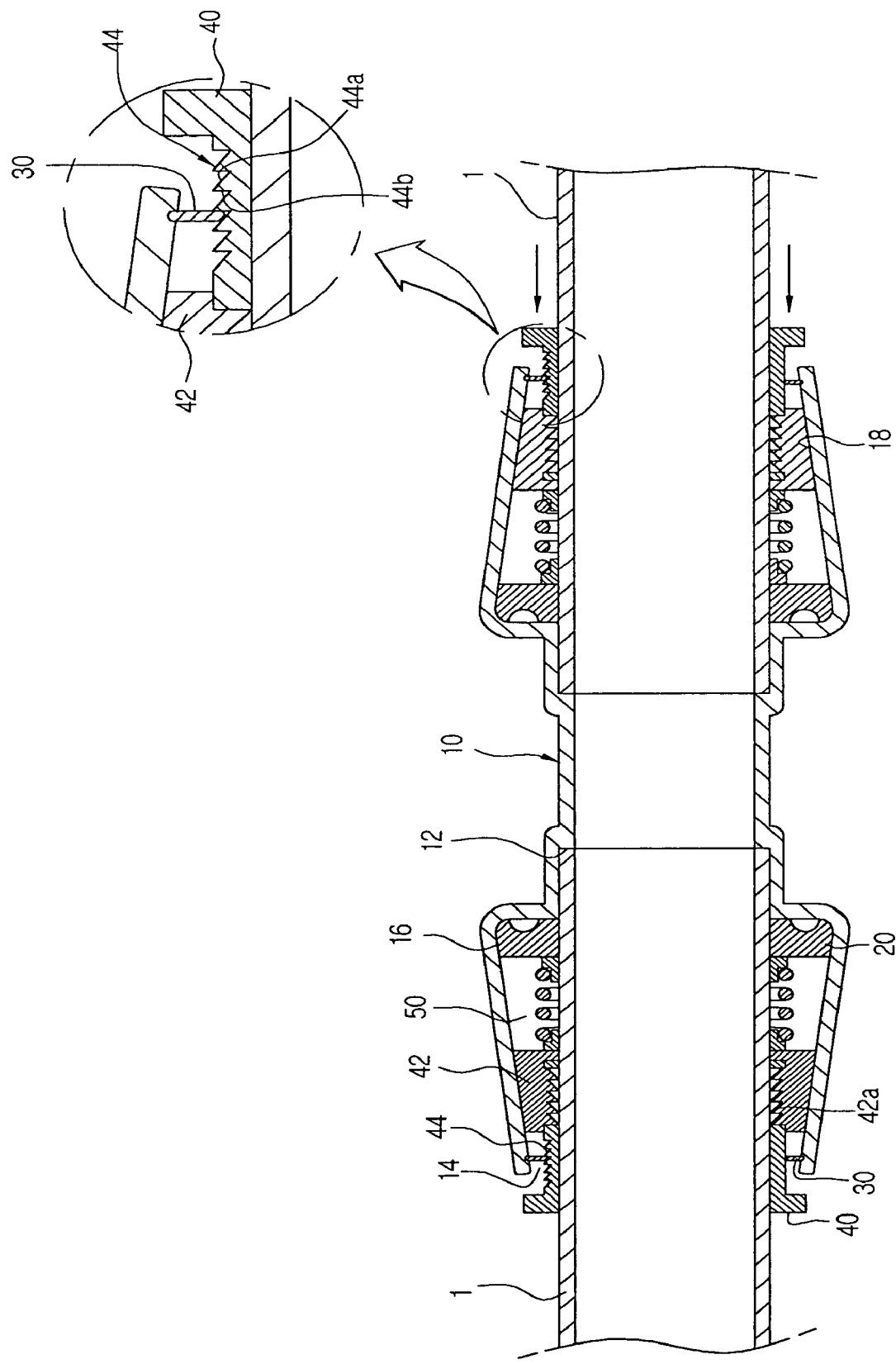
FIG. 2 is a longitudinal sectional view of the pipe coupling according to the first embodiment of the present invention in an assembled state.

FIG. 1 is an exploded perspective view of a pipe coupling according to the first embodiment of the present invention, and FIG. 2 is a longitudinal sectional view of the pipe coupling according to the first embodiment of the present invention in an assembled state.

Referring to FIGS. 1 and 2, the pipe coupling according to the first embodiment of the present invention includes a hollow connection tube 10 for interconnecting pipes 1 inserted into both sides of the connection tube 10, so as to enable the pipes 1 to communicate with each other, and accessories contained in the connection tube 10, so as to clamp the pipes 1 inserted in the connection tube 10.

The connection tube 10 has changing inner and outer diameters. That is, holding shoulders 12 are formed at opposite predetermined inner portions of the connection tube 10, so as to limit the depth by which the pipes 1 can be inserted. At both side portions of the connection tube 10 outside of the holding shoulders 12 are formed maximum diameter portions 16, which respectively have an inner diameter much larger than the outer diameter of the pipes 1. Further, the connection tube 10 has such a shape as that the inner diameter of the connection tube 10 decreases in a direction toward both mouths 14 of the connection tube 10, which respectively have an inner diameter also larger than the outer diameter of the pipes 1.

Meanwhile, the accessories include packing members 20, snap rings 30, jaw couplings 40, and elastic members 50. Each of the packing members 20 is tightly disposed in the maximum diameter portion 16, so as to prevent water from leaking between the connection tube 10 and each of the pipes 1.

The snap rings 30 are inserted inside of the mouths 14 of the connection tube 10 in a compressed state. In this case, each of the snap rings 30 has a form nearly like a circle as shown in FIG. 1, a portion of which is omitted to form a spaced portion 32, which is made from elastic material and thereby can be freely deformed. Consequently, the diameter of each snap ring 30 can be elastically increased and reduced under a limitation by a deformation range of the spaced portion 32, so that the snap ring 30 can be fitted in a groove formed at an outer cylindrical surface of a shaft or an inner cylindrical surface of a tube, thereby performing a usual function of preventing parts from moving. In the case of the present invention, the snap rings 30 respectively prevent each of jaw couplings 40, which will be described later, from being separated.

The jaw couplings 40 are inserted in the mouths 14 of the connection tube 10. Further, a plurality of fixing jaws 42, respectively having serrations 42a formed at a surface to be in contact with the pipe 1, are assembled with each of the jaw coupling 40 while being arranged in a circumferential direction of the jaw coupling 40. Moreover, engaging protuberances 44, each of which has a width smaller than the interval of the spaced portion 32 of the snap ring 30, are formed at a portion of a circumferential surface of each jaw coupling 40 in such a manner as that the engaging protuberances 44 can be engaged with inner ends of the snap ring 30.

The elastic members 50 are respectively inserted between the jaw coupling 40 and the packing member 20, so as to function to push the jaw coupling 40 toward the mouth 14 by means of the elastic force.

In this case, the engaging protuberances 44, each of which has a slant surface 44a at the side of the mouth 14 and a vertical surface 44b at the inner side, form a serrated shape in total, so as to prevent the jaw coupling 40 from being pushed into the connection tube 10 by an external impact as shown by the arrows in FIG. 2.

Figure 3:
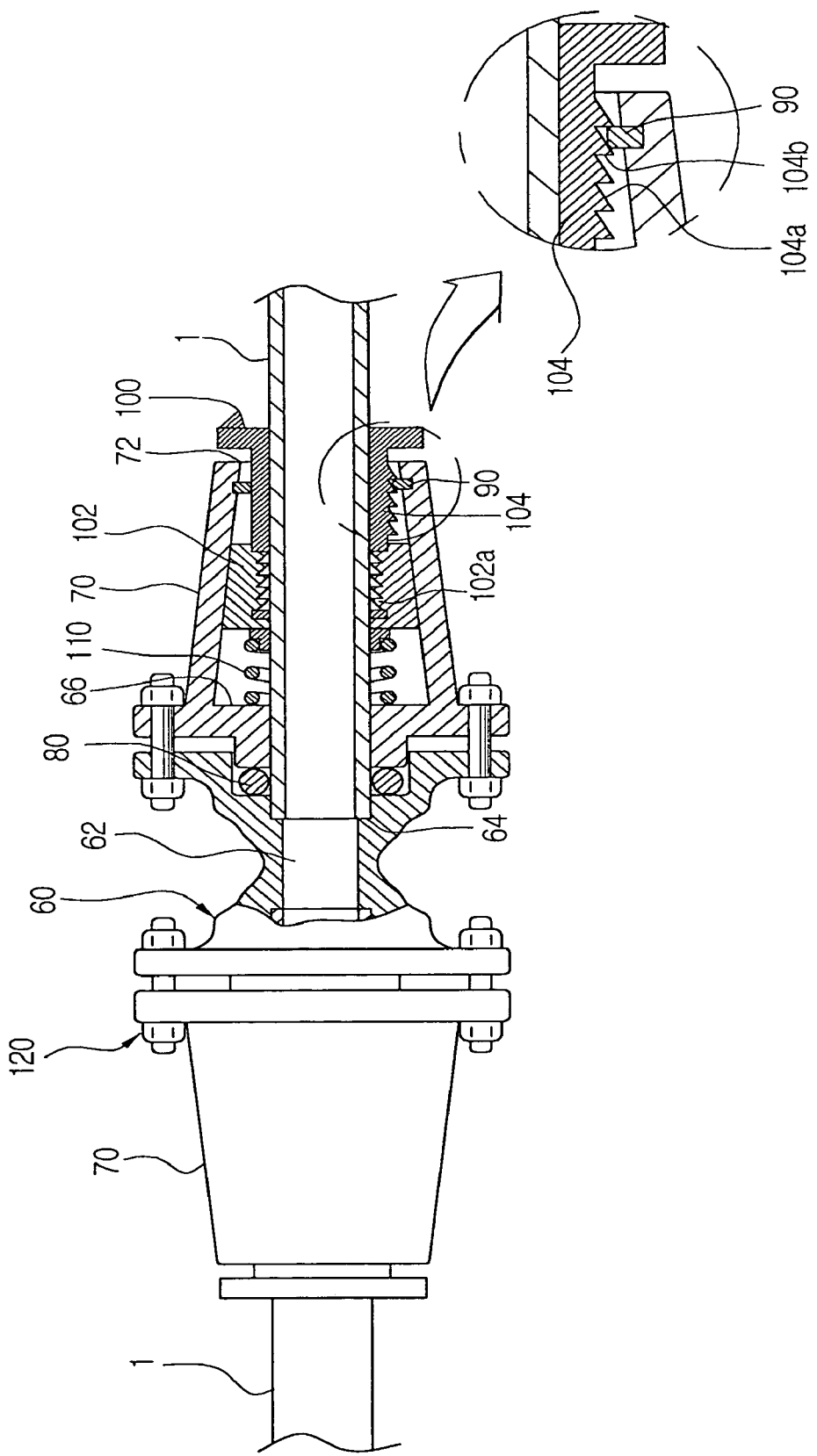
FIG. 3 is a longitudinal sectional view of a pipe coupling according to the second embodiment of the present invention in an assembled state, which shows the construction of the pipe coupling.

In the meantime, FIG. 3 is a longitudinal sectional view of a pipe coupling according to the second embodiment of the present invention in an assembled state, which shows the construction of the pipe coupling.

Referring to FIG. 3, the pipe coupling according to the second embodiment includes a plurality of connection tubes separated from each other and accessories contained in the connection tubes.

First, the connection tubes comprise: a central connection tube 60 having a through hole 62 axially formed in the central connection tube 60 and holding shoulders 64 formed at both ends of the through hole 62 so as to limit the depth by which the pipes 1 can be inserted; and a pair of side connection tubes 70 assembled one by one at both sides of the central connection tube 60 in such a manner as to respectively communicate with the central connection tube 60. Each of the side connection tube 70 has an inner space, through which the pipe 1 is inserted, and which has a construction and a shape whose dimensions gradually decrease from the central connection tube 60 toward the mouth 72.

Further, the accessories include packing members 80, snap rings 90, jaw couplings 100, and elastic members 110. Each of the packing members 80 is interposed between the central connection tube 60 and the side connection tube 70, so as to maintain the portions of connecting the pipes watertight.

The snap rings 90 are inserted inside of the mouth 72 of each side connection tube 70 in a compressed state, so as to prevent the jaw coupling 100 from being separated, which will be described hereinafter.

The jaw couplings 100 are inserted in the mouths 72 of each side connection tube 70. Further, a plurality of fixing jaws 102, respectively having serrations 102a formed at a surface to be in contact with the pipe 1, are assembled with each of the jaw coupling 100 while being arranged in a circumferential direction of the jaw coupling 100. Moreover, engaging protuberances 104, each of which has a width smaller than the interval of a spaced portion 92 of the snap ring 90, are formed at a portion of a circumferential surface of each jaw coupling 100 in such a manner as that the engaging protuberances 104 can be engaged with inner ends of the snap ring 90.

Furthermore, the elastic members 110 are respectively inserted between the jaw coupling 100 and a vertical inner wall 66 of each side connection tube 70 disposed at the side of the central connection tube 60, so as to exhibit an elastic force of pushing the jaw coupling 100 toward the mouth 72 of the side connection tube 70 by means of the elastic force.

Hereinafter, described will be operations of the pipe couplings according to the embodiments of the present invention.

First, a description about the pipe coupling according to the first embodiment will be given with reference to FIGS. 1, 2, 4a, 4b, 5a and 5b. When the pipes 1 are inserted into the jaw couplings 40 from the mouths 14 of the connection tube 10, the pipes 1 push and carry the fixing jaws 42 into the connection tube 10 while compressing the elastic members 50. The pipes 1 having passed through the jaw couplings 40 come to be in contact with the holding shoulders 12 of the connection pipe 10.

In the course of the above procedure, when each of the fixing jaws 42 pushed by the pipes 1 reaches the maximum diameter portion 16, the fixing jaw 42 is widened outward up to the inner diameter of the maximum diameter portion 16 of the connection tube 10, so as to enable the pipe 1 to reach the holding shoulder 12.

Thereafter, each of the fixing jaws 42 having been carried to the central portion of the connection tube 10 is returned toward the mouth 14 of the connection tube 10 by the elastic force of the elastic member 50. While the fixing jaw 42 is returned to the mouth 14, the fixing jaw 42 is contracted according to a reducing inner diameter of a diameter-reducing portion 18 of the connection tube 10, so as to be in tight contact with the pipe 1, thereby firmly clamping the pipe 1.

As described above, in the pipe coupling according to the present invention, the pipes can be assembled with the pipe coupling and connected with each other through the pipe coupling through a simple labor of pushing the pipes into the pipe coupling. Therefore, it goes without saying that the working efficiency is remarkably improved in the pipe coupling of the present invention.

Figure 4A:
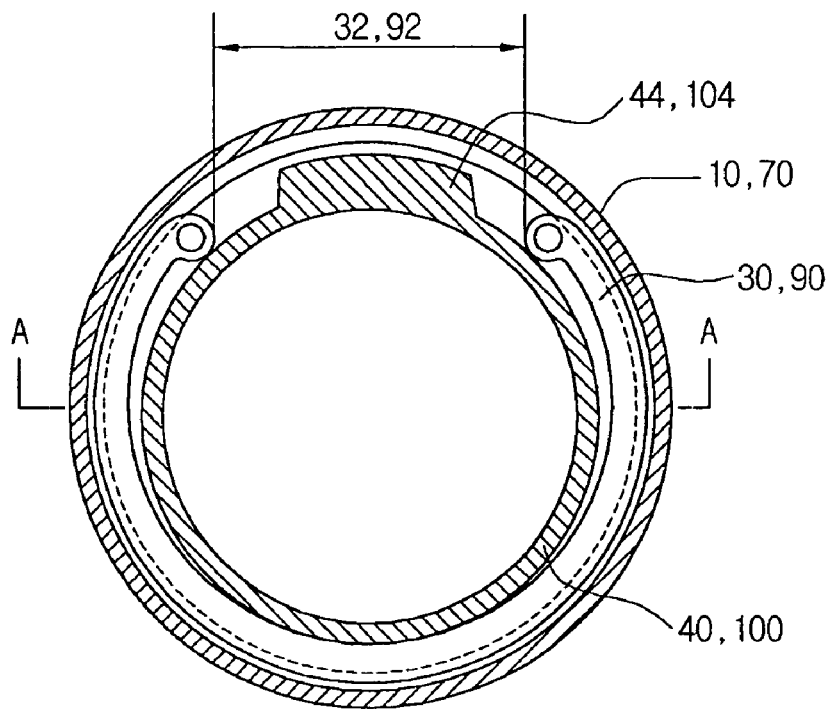
FIGS. 4a and 4b are transverse and longitudinal sectional views of the pipe coupling of the present invention, in a state in which the jaw coupling can be separated from the snap ring.
Figure 4B:
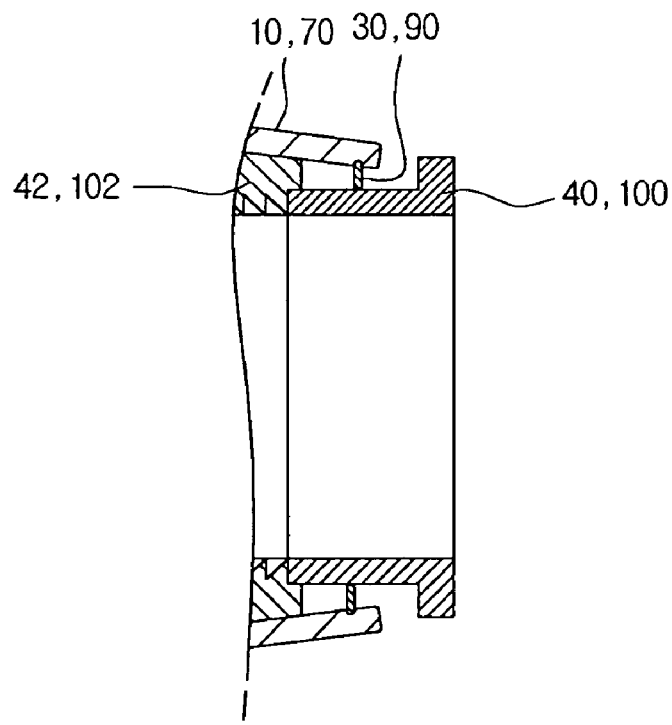
Figure 5A:
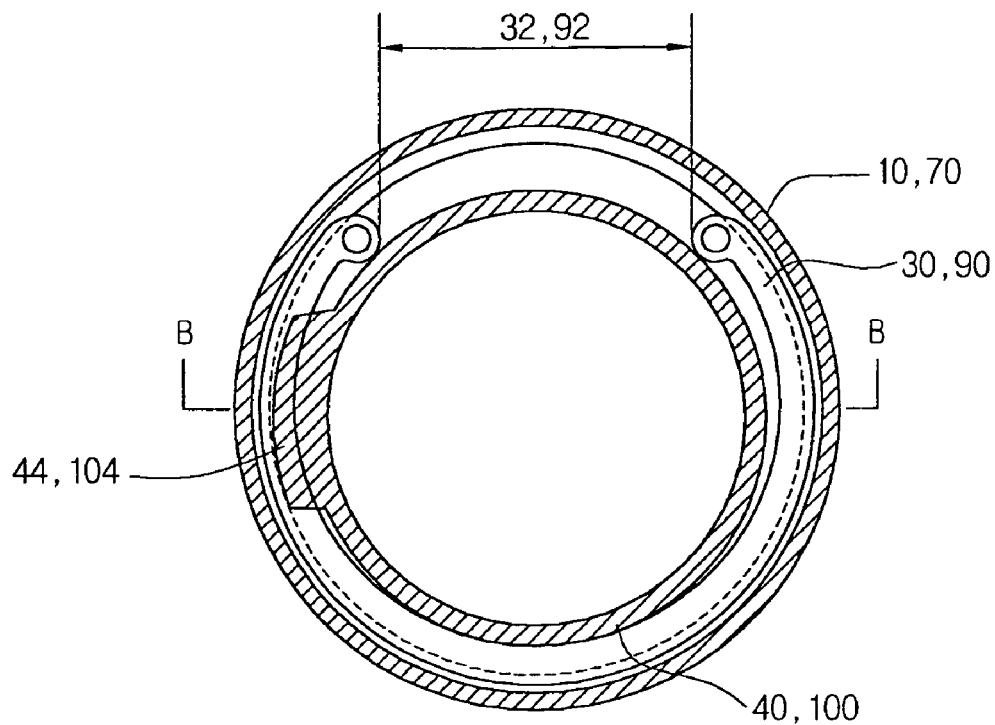
FIGS. 5a and 5b are transverse and longitudinal sectional views of the pipe coupling of the present invention, in a state in which the jaw coupling is tightly engaged with and held by the snap ring.
Figure 5B:
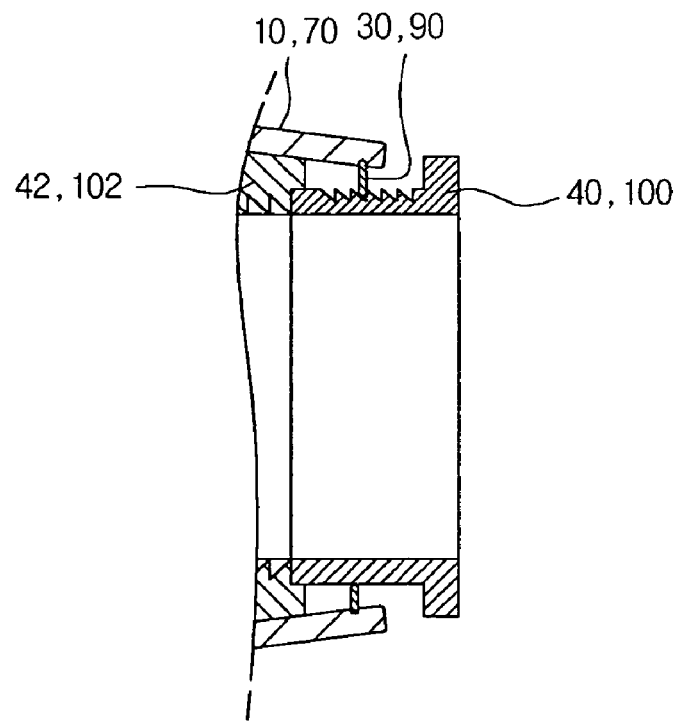

In the meantime, in the pipe coupling of the first embodiment, when it is necessary to replace the packing member 20 due to its aging and the like, the jaw coupling 40 exposed out of the connection tube 10 is rotated until the engaging protuberances 44 formed on the surface of the jaw coupling 40 are located in the spaced portion 32 of the snap ring 30 as shown in FIGS. 4a and 4b, and then the jaw coupling 40 is separated from the connection tube 10. Thereafter, the other parts are sequentially separated, so that the packing member 20 can be replaced. After the labor of the replacement, the parts are assembled according to a reverse order to the assembling order. At the final stage, as shown in FIGS. 5a and 5b, the jaw coupling 40 is arranged in such a manner that the engaging protuberances 44 of the jaw coupling 40 coincide with the spaced portion 32 of the snap ring 30, and the jaw coupling 40 is inserted into the connection tube 10. Thereafter, the jaw coupling 40 is rotated in one direction so as not to be coincide with the spaced portion 32 of the snap ring 30, so that the engaging protuberances 44 of the jaw coupling 40 is engaged with the inner end of the snap ring 30, thereby maintaining the assembled state.

The pipe coupling according to the first embodiment of the present invention as described above is proper in connecting pipes having a relatively small diameter.

A description about a pipe coupling according to the second embodiment of the present invention will be given hereinafter with reference to FIGS. 3, 4a, 4b, 5a and 5b. In the pipe coupling according to the present embodiment, which is proper in connecting pipes having a relatively large diameter, the pipes 1 are firstly fitted through and assembled with the side connection tubes 70, due to the difficulty of handling large pipes. Then, connection ends of the pipes 1 are inserted into both ends of the central connection tube 60, and then the central connection tube 60 is assembled respectively with the side connection tubes 70 by means of screws 120. The procedure of fitting the pipe 1 into the side connection tube 70 is the same as that in the first embodiment.

The reason of requiring the above procedure in the second embodiment is as follows. That is, since it is difficult to exactly fit a large pipe into the pipe coupling, the large pipe is fitted into and fixed to the side connection tube 70, and then the pipe assembled with the side connection tube 70 is fitted into the central connection tube 60, so as to enable the pipes to be connected in line with each other.

Also in the present embodiment, as shown in FIGS. 4a, 4b, 5a, and 5b, since the jaw coupling 100 can be separated in the same way as that in the first embodiment, the accessories in the side connection tube 70 can be replaced. However, the packing member 80 can be replaced only after the central connection tube 60 is separated from the side connection tubes 70.

INDUSTRIAL APPLICABILITY

In the pipe coupling according to the present invention as described above, since the pipes can be connected with and separated from each other through a one-touch operation, the labors of interconnecting and separating the pipes can be easily performed. Moreover, since interior parts including the packing members can be replaced, the life span of a product can be prolonged.

Furthermore, the present invention provides pipe couplings, which are respectively proper in connecting pipes having relatively large diameters and in connecting pipes having relatively small diameters. In result, a proper pipe coupling can be chosen according to the dimension of the pipes, so as to provide the labor of connecting the pipes with efficiency.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A pipe coupling for connecting pipes with each other, the pipe coupling comprising:
    a connection tube having changing inner and outer diameters, the connection tube including holding shoulders formed at opposite predetermined inner portions of the connection tube and maximum diameter portions formed at both side portions of the connection tube outside of the holding shoulders, each of the holding shoulders limiting a depth by which each of the pipes can be inserted, the maximum diameter portions respectively having an inner diameter much larger than an outer diameter of the pipes, the connection tube having an inner diameter which decreases in a direction toward both mouths of the connection tube from the maximum diameter portions;
    snap rings inserted inside of the mouths of the connection tube in a compressed state;
    packing members, each of which is tightly disposed in each of the maximum diameter portions;
    jaw couplings inserted in the mouths of the connection tube, each of the jaw couplings being assembled with a plurality of fixing jaws and having engaging protuberances, the fixing jaws respectively having serrations formed at a surface to be in contact with each of the pipes, the fixing jaws being arranged in a circumferential direction of each of the jaw couplings, each of the engaging protuberances having a width smaller than an interval of a spaced portion of each of the snap rings, the engaging protuberances being engaged with inner ends of the snap ring; and
    elastic members inserted between the jaw couplings and the packing members.

2. A pipe coupling as claimed in claim 1, wherein each of the engaging protuberances has a slant surface and a vertical surface, the slant surface and the vertical surface respectively being disposed at an inner side of the mouth, so that the engaging protuberances form a serrated shape in total.

3. A pipe coupling for connecting pipes with each other, the pipe coupling comprising:

a central connection tube having a through hole axially formed in the central connection tube and holding shoulders formed at both ends of the through hole so as to limit a depth by which each of the pipes can be inserted;

side connection tubes assembled at both sides of the central connection tube in such a manner as to respectively communicate with the central connection tube, each of the side connection tubes having an inner space, through which each of the pipes is inserted, and whose construction and shape have dimensions gradually decreasing from the central connection tube toward mouths of the side connection tubes;

packing members respectively interposed between the central connection tube and each of the side connection tubes;

snap rings respectively inserted inside of the mouths of the side connection tubes in a compressed state;

jaw couplings respectively inserted in each of the mouths of the side connection tubes, each of the jaw couplings being assembled with a plurality of fixing jaws and having engaging protuberances, the fixing jaws respectively having serrations formed at a surface to be in contact with each of the pipes, the fixing jaws being arranged in a circumferential direction of each of the jaw couplings, each of the engaging protuberances having a width smaller than an interval of a spaced portion of each of the snap rings, the engaging protuberances being engaged with inner ends of the snap ring; and elastic members respectively inserted between the jaw coupling and a vertical inner wall of each side connection tube, the vertical inner wall being disposed at a side of the central connection tube.

4. A pipe coupling as claimed in claim 3, wherein each of the engaging protuberances has a slant surface and a vertical surface, the slant surface and the vertical surface respectively being disposed at an inner side of the mouth, so that the engaging protuberances form a serrated shape in total.

* * * * *